Nov. 6, 1962 R. W. KALNS ETAL 3,062,961

CIRCUIT CONTROLLING DEVICE

Filed Jan. 3, 1961

INVENTORS.
ALFRED W. VASEL
RUDOLPH W. KALNS
BY
Robert E. Ross
ATTORNEY

United States Patent Office 3,062,961
Patented Nov. 6, 1962

3,062,961

CIRCUIT CONTROLLING DEVICE

Rudolph W. Kalns, 21 Mason St., Weymouth, Mass., and Alfred W. Vasel, 222 Linwood St., Abington, Mass.

Filed Jan. 3, 1961, Ser. No. 80,448
2 Claims. (Cl. 250—206)

This invention relates generally to circuit controlling devices and has particular reference to a photo-responsive device for controlling an external circuit in response to incident radiant energy.

The detection and utilization of radiant energy in the light spectrum, by which term is meant to include the ultraviolet and infra-red bands, is often accomplished by causing said energy to fall on a photo-resistive device, which responds by an increase in electrical conductivity, with the amount of said increase depending on the cell composition, and the intensity and wave length of the light. The change in conductivity is usually detected by incorporating the photo-resistive device into an amplifier circuit utilizing vacuum tubes or transistors. The amplifier output is fed to a device to be controlled or actuated, such as a relay or a warning device such as a horn or light. Devices of this type are commonly used as flame or smoke detectors, hence it is essential that they be extremely reliable, and must be capable of remaining inactive yet ready for operation over long periods of time with a minimum of maintenance.

To be most effective and useful, the device must also be capable of detecting low levels of radiant energy, or small amounts of smoke, however, a high sensitivity necessarily requires a more complex amplifier circuit with resulting increase in cost and decrease in reliability.

The object of this invention is to provide a circuit controlling device responsive to radiant energy which eliminates the need for conventional amplifying devices utilizing vacuum tubes or transistors.

A further object of the invention is to provide a circuit controlling device of the type described which is capable of detecting low levels of radiant energy with a high degree of reliability.

A further object of the invention is to provide a circuit controlling device of the type described which is adapted for use in installations where the power means for energizing the external circuit must be electrically isolated from the power source for the radiation detecting device.

Other objects of the invention will be apparent to one skilled in the art from the following detailed description of specific embodiments thereof.

Figure 1:
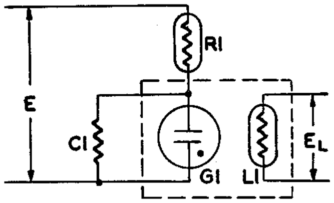
FIG. 1 is a circuit diagram of a circuit controlling device embodying the features of the invention which is particularly adapted for use as a smoke detector.

Referring to FIG. 1 of the drawing, there is illustrated schematically a circuit controlling or actuating device which is adapted for use in detecting radiant energy in the light spectrum to operate an alarm system or the like, or in some cases, to actuate or control an external circuit in response to light intentionally directed onto the device.

In the illustrated embodiment the device comprises a photo-resistive cell R1 connected in series with a light producing device such as a glow tube G1, and adapted to be connected to a source of electrical energy E. A second photo-responsive device L1 is positioned in relation to the glow tube G1 so as to receive light radiation therefrom when the glow tube is energized, and is adapted to be connected to an external circuit to be controlled. A calibrating resistor C1 may be connected in parallel with the glow tube G1 for a purpose to appear hereinafter.

The device of FIG. 1 is particularly adapted for use as the detecting element of a smoke detector of the diffusion type, in which an actuating light beam and the detector are positioned in a suitable housing in such a manner that when smoke is present in the housing, light from the beam is reflected or diffused from the smoke particles onto the detector. In the calibration of such devices, it is convenient to refer to the smoke concentration as percent smoke, which is measured as the percent of light absorbed by a column of smoke one foot long. For example, if 2% of the light is absorbed, the condition is referred to as 2% smoke.

In a specific embodiment of the invention for the above purpose, the cell R1 may be formed of a photo-resistive material primarily responsive to the red to infra-red band of radiation, such as polycrystalline cadmium sulfide, the glow tube G1 may be a two element neon bulb with a striking voltage of about 80 volts, the cell L1 may be a photo-resistive device similar to cell R2, and the resistor C1 may have a resistance of 10 megohms. The glow tube G1 and the output cell L1 are preferably enclosed in a light-proof housing with suitable reflector means to cause substantially all of the light produced by the neon to fall on the cell L1.

With a source voltage of 115 volts A.C. applied across the cell and glow tube in series, the circuit reacts to various light conditions in the following manner:

With no light falling on cell R1, its resistance is substantially infinite, hence no voltage appears across the neon tube G1. Under normal conditions of use, some small amount of light from the actuating beam may be reflected onto the cell from dust particles in the air or from the interior walls of the housing. With the normal size actuating beam, for example, from a 1 watt incandescent light, sufficient diffused light may fall on the cell under conditions of no smoke, to reduce its resistance to about 100 megohms. Hence only about 10% of the source voltage appears across the bulb G1, which is insufficient to energize it so that no light falls on the output cell L1, and its resistance is substantially infinite. Under conditions of about 1% smoke, sufficient light is reflected from the smoke particles onto the cell R1 to lower its resistance to about 4.7 megohms so that about 68% of the source voltage appears across the tube, which is just under the voltage required to energize the tube.

When the smoke concentration is 2%, the light reflected from the smoke particles onto the cell lowers its resistance to about 2.2 megohms, so that over 80% of the source voltage appears across the tube, which is sufficient voltage to energize the tube and cause it to radiate light onto the cell L1. In the illustrated situation, it has been found that the light so produced by the tube, in falling on output cell L1, reduces its resistance from infinity to about 20,000 ohms, permitting sufficient current to flow in the external circuit to energize a relay or the like to actuate an alarm system.

It will be apparent that a greater concentration of smoke, in causing a greater amount of light to fall on the cell R1, will permit more current to flow through the bulb G2, increasing the light output and causing a further reduction in the resistance of the output cell L1. For example, under conditions of 4% smoke, the resistance of cell R1 is reduced to 1 megohm, resulting in a reduction of the resistance of cell L1 to 4000 ohms.

The concentration of smoke at which the device is initially actuated may be varied by varying the value of the calibrating resistor C1. Reducing the resistance of C1 will reduce the percent smoke required to actuate the neon tube, whereas increasing the value of C1 will have the opposite effect.

In addition to its application in smoke detector systems, the device of FIG. 1 may also be used in applications where it is desired to intentionally actuate the controlled circuit by directing a beam of light onto the cell R. For example, an incandescent light producing 100 foot candles on cell R1 will reduce its resistance to about 100,000 ohms, energizing bulb G1 to produce a light intensity on the output cell L1 sufficient to reduce its resistance to about 500 ohms. In such applications the value of the calibrating resistor C1 may be selected to prevent operation by ambient light in the particular environment.

In many applications utilizing photo-electric devices it is convenient to utilize the interruption of a light beam to actuate the controlled circuit, and when the device of FIG. 1 is used in this manner, the beam will normally maintain the glow tube energized, so that the output cell L1 will be normally conductive. Hence the external circuit to be controlled may be provided with actuating means responsive to an increase in resistance of the cell L1 resulting from the extinguishing of the bulb G1 by the interruption of the light source. Circuits and devices for this purpose are well known in the art.

Figure 4:
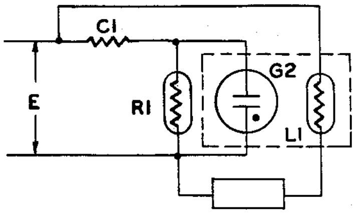
FIG. 4 is a diagram of a circuit controlling device for use where a fast response is desired.

The speed of response to incident light of cells of the type of R1 and L1 is of the order of 10 milliseconds, whereas the time of response in returning to the original condition when the incident light is extinguished is of the order of 100 milliseconds. Where a faster response is necessary, the circuit elements of FIG. 1 may be rearranged into the form shown in FIG. 4, with the calibrating resistor C1 and the glow tube G2 connected in series across the source E, and the cell R1 connected in parallel with the tube G2. The output cell L1 is disposed in the same relation to the tube G2 as in the device of FIG. 1. With a continuous actuating beam of light directed onto cell R1, its resistance is held to a relatively low value, for example 100,000 ohms, so that insufficient voltage appears across the tube to energize it. However, when the actuating beam is interrupted, the resistance of cell R1 increases to a much higher value, thereby energizing the tube G1, and consequently energizing the external circuit by the resultant lowering of the resistance of cell L1 in response to the light from the tube G1.

Figure 2:
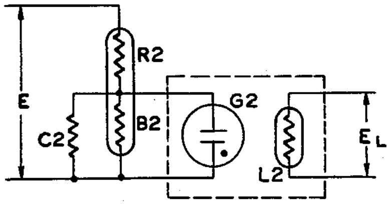
FIG. 2 is a circuit diagram of a circuit controlling device which is particularly adapted for use in applications where it is desirable to distinguish between infra-red radiation and daylight.

Referring to FIG. 2 of the drawing, there is illustrated a modified form of circuit controlling device within the scope of the invention, which is adapted for use in a fire detection system which is capable of distinguishing between sunlight and radiation from a flame.

The device comprises a pair of photo-sensitive devices R2 and B2 connected in series and adapted to be connected across a source of electrical energy E, a neon glow tube G2 connected in parallel with the cell B2, and an output photo-responsive device L2 positioned to receive radiant energy from the glow tube G2.

In the particular embodiment illustrated the cell R2, as in the previous example, may be primarily responsive to light in the red to infra-red band, whereas the cell B2 may be primarily responsive by a substantial decrease of resistance to a band outside the red to infra-red, such as the blue to yellow band, and responsive by a much smaller decrease in resistance to light in the red to infra-red band. A material having these characteristics is mono-crystalline cadmium sulfide. As in the previous example, the output cell L2 may be similar to the cell R2, and is preferably enclosed in a lightproof housing with the tube G2.

The response under various light conditions of cells of the type described above is fully disclosed in a co-pending application Serial No. 788,318, filed January 22, 1959 by the present co-inventor, Alfred W. Vasel, and Donald F. Steele.

The operation of the device of FIG. 2, when connected to a source voltage of 115 A.C. may be summarized as follows:

| Condition | R2 Ohms | B2 Ohms | G2 Energized | L2 Ohms |
|---|---|---|---|---|
| Dark | Inf. | Inf. | No | Inf. |
| Sunlight (Low Intensity) | 50,000 | 10,000 | No | Inf. |
| Incandescent (100 F.C.) | 100,000 | 100,000 | No | Inf. |
| Fire (Small) | 800,000 | 10,000,000 | Yes | 50,000 |
| Fire (Large) | 100,000 | 1,000,000 | Yes | 10,000 |

As in the previous example, in the dark, the resistance of both cells is substantially infinite, hence the tube G2 is not energized. In sunlight, although the resistance of cell B2, primarily responsive to the blue to yellow band, has dropped to 10,000 ohms, the resistance of cell R2 has dropped to 50,000 ohms, hence only about 1/6 of the applied voltage appears across the glow tube, which is insufficient to energize it. Incandescent light causes the resistance of the two cells to drop to about the same value, so that only about half of the applied voltage appears across the glow tube.

However, when light from a flame, containing a substantial amount of infra-red, falls on the cells, the resistance of cell R2 drops to a much lower value than does the resistance of cell B2. For example, a small flame will cause the resistance of R2 to drop to about 800,000 ohms, whereas the resistance of B2 only drops to about 10 megohms. Hence about 80% of the applied voltage appears across the glow tube G2, causing it to become energized and radiate light onto the cell L2, reducing its resistance to about 1400 ohms, permitting current to flow in the output circuit to energize an alarm device or the like. With infra-red radiation of greater intensity, as for example from a large fire, the resistance of cell R2 may be reduced to 100,000 ohms, whereas the resistance of cell B2 is only reduced to 1 megohm. Hence over 90% of the source voltage appears across the tube G2. This greater voltage, and the increased current through the tube G2 resulting from the decreased resistance of R2, produces more light on cell L2, so that the resistance thereof is further reduced to about 500 ohms. Hence the device of FIG. 2 is not only capable of distinguishing between flame and other type of light, but may also be utilized to provide an indication of the size of the flame.

A calibrating resistor C2 may be connected in parallel with the cell B2, to prevent undesired actuation of the bulb G2 by levels of radiation below a predetermined standard, and also to compensate for the different response characteristics that occur in a group of production cells of the same type. The exact resistance value of C2 will depend on the above factors, with a resistance of 1 megohm being suitable for a typical pair of cells.

Figure 3:
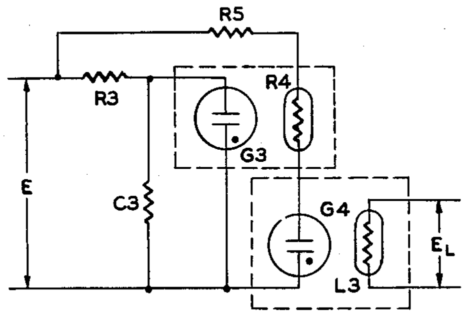
FIG. 3 is a circuit diagram of a modified form of the device which is capable of controlling relatively large currents in low impedence circuits by means of an extremely small input signal in a high impedence circuit.

Referring now to FIG. 3, there is illustrated a modified form of device within the scope of the invention which is particularly adapted for use in controlling a relatively large amount of power in an output circuit by an extremely small amount of current in a control circuit; and comprises a resistor R3, which may be variable in response to an external condition to be measured or detected, connected in series with a light source G3, across a source of electrical energy E. A calibrating resistor C3 is connected in parallel with the light source G3. A photo-responsive cell R4 is positioned to receive light radiation from the light source, and as in the previous examples, the light source G3 and the cell R4 may be enclosed in a light-proof enclosure. The cell R4 is connected in series with a second light source G4 and a limiting resistor R5 across a source of electrical energy, which may be the source E. A photo-responsive cell L3 is positioned to receive light from the light source G4 and is adapted to be connected to an external circuit to be controlled.

In a specific embodiment of the device of FIG. 3, R3, R4, and R5 may all be photo-resistive cells primarily responsive to the red to infra-red light band, and the light sources G3 and G4 may be neon glow tubes as previously described. The calibrating resistor C3 may have a typical value of 10 megohms, and the limiting resistor may have a value of about 100,000 ohms.

With a source voltage of 115 A.C. applied to the input, R3, G3, C3, operate in the manner previously described in connection with FIG. 1. As the resistance of R3 drops in response to infra-red radiation, a point is reached at which the voltage across C3 reaches the actuating voltage of G3, which then radiates light onto cell R4. The resistance of R4 is thereby greatly lowered, igniting tube G4, which in turn radiates light onto output cell L3. By reason of the concentration of light from the tube G3, the resistance of cell R4 drops to a much lower value than that of the input cell R3, hence more current flows through tube G4 than through G3, so that more light is emitted therefrom, reducing the resistance of output cell L3 to a lower value than R4. In a typical case, when sufficient light falls on cell R3 to reduce its resistance to about 2 megohms, sufficient light is produced by tube G3 to drop the resistance of cell R4 to about 3800 ohms, which in turn produces a much greater amount of light from tube G4, reducing the resistance of L3 to about 100 ohms or less.

Although in the specific embodiments described above, the input resistance is a photo-responsive device, it will be understood that many other types of variable resistance devices may be used in the input circuit, such as devices responsive by a change of resistance to temperature, pressure, strain, and the like. It will also be understood that the ouput cells L1, L2, and L3 may in some cases be photo-generative devices.

Since certain other obvious modifications may be made in the devices shown without departing from the scope of the invention, it is intended that all matter contained herein be interpreted in an illustrative and not a limiting sense.

Having thus described our invention, what we claim as new and desire to secure by Letters Patent of the United States is:

1. A photo-electric detecting apparatus comprising a pair of photo-resistive cells adapted to be connected in series across a source of electrical energy, one of the cells being primarily responsive by a decrease in resistance to light energy in the red to infra-red band, the other cell being primarily responsive by a decrease in resistance to light energy in a band other than the red to infra-red band, a light producing device connected in parallel with said other cell and adapted to be energized by the relative change in resistance of said cells, and a photo-responsive device positioned to receive light from said light producing device and adapted to be connected to an extrnal circuit to be controlled.

2. A photo-electric detecting apparatus, comprising a pair of photo-responsive cells adapted to be connected in series across a source of electrical energy, one of the cells being primarily responsive to light energy of one frequency band, the other cell being primarily responsive to light energy of another frequency band, a light producing device connected in parallel with one of said cells and adapted to be energized by a relative change in resistance of said cells, and a photo-responsive device positioned to receive light from said light producing device and adapted to be connected to an external circuit to be controlled.

References Cited in the file of this patent

UNITED STATES PATENTS 2,727,683 Allen et al. ............. Dec. 20, 1955